US010856026B2

United States Patent
Krechman

(10) Patent No.: US 10,856,026 B2
(45) Date of Patent: Dec. 1, 2020

(54) VIDEO BROADCASTING SYSTEM

(71) Applicant: Carole Summer Krechman, Rancho Mirage, CA (US)

(72) Inventor: Carole Summer Krechman, Rancho Mirage, CA (US)

( * ) Notice: Subject to any disclaimer, the term of this patent is extended or adjusted under 35 U.S.C. 154(b) by 0 days.

(21) Appl. No.: 15/715,637

(22) Filed: Sep. 26, 2017

(65) Prior Publication Data

US 2018/0091838 A1    Mar. 29, 2018

Related U.S. Application Data

(60) Provisional application No. 62/400,502, filed on Sep. 27, 2016.

(51) Int. Cl.
| | |
|---|---|
| H04N 21/41 | (2011.01) |
| H04N 21/4367 | (2011.01) |
| H04N 21/258 | (2011.01) |
| H04N 21/475 | (2011.01) |

(52) U.S. Cl.
CPC . *H04N 21/25875* (2013.01); *H04N 21/25891* (2013.01); *H04N 21/4126* (2013.01); *H04N 21/4367* (2013.01); *H04N 21/4756* (2013.01)

(58) Field of Classification Search
CPC ......... H04N 21/25875; H04N 21/4756; H04N 21/4367; H04N 21/25891; H04N 21/4126
See application file for complete search history.

(56) References Cited

U.S. PATENT DOCUMENTS

| | | | | |
|---|---|---|---|---|
| 5,790,935 | A * | 8/1998 | Payton | H04N 7/17336 348/E7.073 |
| 2004/0268403 | A1* | 12/2004 | Krieger | H04N 5/44543 725/112 |
| 2006/0224696 | A1* | 10/2006 | King | H04N 7/173 709/218 |
| 2007/0022469 | A1* | 1/2007 | Cooper | H04K 1/00 726/3 |
| 2010/0064138 | A1* | 3/2010 | Hwang | H04L 63/18 713/168 |
| 2012/0153015 | A1* | 6/2012 | Gomez | H04N 21/4126 235/375 |
| 2013/0074168 | A1 | 3/2013 | Hao et al. | |

(Continued)

OTHER PUBLICATIONS

International Search Report for PCT/US2017/053481 dated Dec. 1, 2017.

*Primary Examiner* — Benjamin R Bruckart
*Assistant Examiner* — Tien M Nguyen
(74) *Attorney, Agent, or Firm* — Fitzgerald IP Law; John K Fitzgerald, Esq.

(57) ABSTRACT

A mobile system that resolve the communication and engagement challenge that companies face on a daily basis including a mobile video app that compliments existing employee communication of large multinational companies to provide immediate and direct communication to employees in several languages. The system includes a local server that communicates with a mainframe during off peak band width periods and distributing the content locally through a private WiFi network. The system may also be configured as a plug in to a software based inventory system utilizing bar codes that may be scanned to provide video content regarding a particular product.

15 Claims, 9 Drawing Sheets

(56) References Cited

U.S. PATENT DOCUMENTS

| | | | |
|---|---|---|---|
| 2014/0059624 A1* | 2/2014 | Ellis | H04N 5/44543 |
| | | | 725/87 |
| 2014/0074866 A1 | 3/2014 | Shah et al. | |
| 2014/0208351 A1 | 7/2014 | Moore | |
| 2014/0244806 A1 | 8/2014 | Chan et al. | |

* cited by examiner

FIG. 4

Default Language Video Title

| Conflict Resolution |
|---|

| | Video Description |
|---|---|
| English [Delete] [Update] | Learn how to mediate employee conflict. Effective employee conflict resolution. |
| Spanish [Delete] [Update] | Aprenda a mediar el conflicto de empleados. Resolución eficaz de conflictos entre los empleados. |
| Chinese [Delete] [Update] | 了解如何調解員工衝突。有效的員工衝突解決。 |
| Itailian [Delete] [Update] | Scopri come mediare il conflitto tra dipendenti. Risoluzione dei conflitti efficaci dei dipendenti. |
| French [Delete] [Update] | Apprenez à médier les conflits des employés. Résolution efficace des conflits des employés. |
| German [Delete] [Update] | Erfahren Sie, wie Sie Mitarbeiter-Konflikte vermitteln können. Effektive Mitarbeiter-Konfliktlösung. |

Add New Custom Field:

| Add Language Field: | Language |
|---|---|
| -Select- ▽ | |

Local Language Translated Video Content

English
  Subtitles: ☐
  Title: Mediating Employee Conflict
  Image: [        ] [Upload Image]
  Video URL: http://52.39.238.159/wp-co [Upload Video]
  Duration:

Spanish
  Subtitles: ☐
  Title: Conflicto de empleados mediado
  Image: [        ] [Upload Image]
  Video URL: http://52.39.238.159/wp-co [Upload Video]
  Duration:

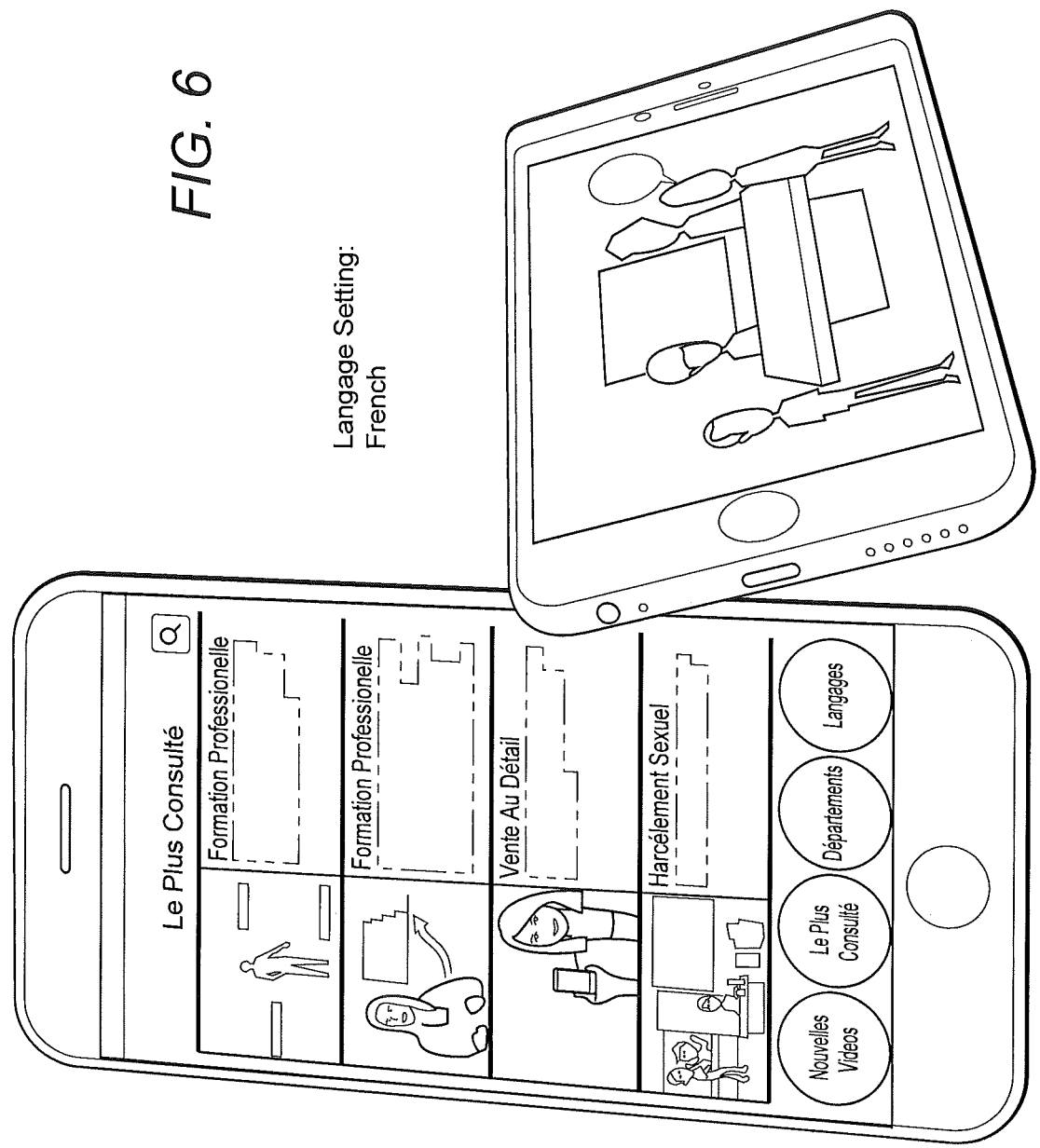

VIDEO BROADCASTING SYSTEM

CROSS-REFERENCES TO RELATED APPLICATIONS

This application claims priority from U.S. Provisional Application No. 62/400,502, filed Sep. 27, 2016, incorporated by reference herein in its entirety.

BACKGROUND

Various prior systems have been proposed for distributing videos and information to employees. However, all of these systems have been unsecure, and require large amounts of band width that ties up the network resources of a company and decreases performance and reliability.

One problem inherent in using the Internet to stream or transmit video content is that there is only a limited amount of bandwidth available from the Internet backbone system to the final mile of the distribution system. For example, while the backbone may have gigabits of bandwidth, it is not uncommon for Internet Service Providers ("ISPs") to provide its customers with bandwidths of less than 100 megabits. This throttling results in much slower transmission of video content to an end user, and also results in a less reliable system because problems that occur when the transmission is overloaded may cause the entire distribution system, as well as user's computer networks and work stations, to crash.

Yet another inherent problem of transmitting data such as video content over the Internet is that such data and content is being transmitted through an essentially open network, which may be vulnerable to hacking or theft. A new problem is that the data may be kidnapped and held for ransom. One method of reducing the risk of such problems is to encrypt the data and or content. Such encryption, however, requires complicated encryption and decryption regimes and programs, adding to cost and time lag in distribution of the data and content. Moreover, should the encryption an decryption regimes become un-synched, such as when the public and/or private keys of the encryption regime become lost, the data and content may be irretrievably lost.

What has been needed, and heretofore has been unavailable, is a system designed for direct communication and video communication between management and employees, that provides an engaging, fun way for companies to communicate with their employees. Such a system can help teach, inform, motivate and empower employees, thus providing for the creation of inner communities which increases productivity and reduces turn-over, saving costs and increasing profits. Moreover, such a system is secure because it uses private, not public, network transmission methods and is configured to prevent sharing or transmission of proprietary information outside of the private network. The system should also be able to be configured to only transmit large data loads at times when the private transmission lines are underutilized so that downloading of large amounts of information, such as videos, can be accomplished without substantially impacting the performance of a user's private network. Further, such a system must provide a technological solution to the technological problem of providing for large bandwidth to handle the large amount of data comprising video content. The present invention satisfies these and other needs.

SUMMARY OF THE INVENTION

In its most general aspect, the invention includes a complex and sophisticated mobile app that compliments existing employee communication. In other aspects, the invention includes a simple and technologically advanced way for companies to communicate with their employees with multiple language support. Videos can be created that can teach, inform, motivate and empower employees creating inner communities which increases productivity and reduces turnover, saving costs and increasing profits.

In another broad general aspect, the invention includes a system and method that provides a mobile solution that resolve the communication and engagement challenge that companies face on a daily basis. Such a system is a secure and private complex and sophisticated solution interfaced through a mobile video app that compliments existing employee communication of large multinational companies solving the problem of disengaged employees by providing information in the form of video content directly to the employees provided in several languages. Alongside with the module for direct communication and video communication, the system solves the private network bottleneck of video streaming by utilizing a local server or servers to communicate with a computer associated with a database of video content that may be accessed by the local serving during off peak band width periods, such as business closing times, and distributing the content locally through a private WiFi network in the company to servers and/or associated electronic storage modules that can then be accessed by employees, or distributed directly to an employee's mobile device, such as a cellular telephone or other well-known device connected to the private WiFi network. The system may also be a plug in to a software based inventory system supporting bar codes. A video including product information may be called by scanning a barcode associated with a product.

In another aspect, an app embodying principles of the invention may be fully customizable as required to meet company needs. Moreover, the app may be isolated from the general public by appropriate firewalls and cybersecurity software to prevent private content from being re-communicated to a public network by an employee. Alternatively, the private WiFi network to which the app is connected may simply not be connected to any public network, thus avoiding the possibility of intrusion. In still other aspects, the app may include full encryption and receipt of confirmation of communication read by each recipient with a private email and/or notification feature.

In another broad aspect, the invention includes a system that delivers video in a simple and elegant manner. Designed for optimal viewer experience, departments may control the video distribution within each company. In other aspects, for example, the invention includes a system for solving the problem of how to track the distribution of training videos, how-to, compliance, and human resources within a company environment. In another aspect, the invention may be applied in the retailing environment to provide video content to customers to educate the customer both about the products offered by a company and how to utilize them. In one aspect, videos regarding a product may be invoked by a customer by scanning a barcode on the product so as to provide an information related to the product to the customer.

In another aspect, the invention may provide Push Notifications from management to inform employees and the like when a new video has been added to portfolio of available videos, to request feedback from specific sections, to provide motivational messages to all employees, or, alternatively, to specific regions, divisions or subsidiaries of a company, or to specific individuals. Employees may upload their videos as direct video communication and/or to provide feedback to the heads of departments of a company.

In another broad aspect, the invention may be embodied in an app for use to program the processor of client device, such as a smart phone, computer, tablet, and the like. Such an app may be fully customizable to the company needs and is not available to the general public. Upon request it may have full encryption and receipt of confirmation of communication with a RPost proprietary system. In its broadest aspect, the invention addresses the critical needs of large corporate market segments by offering video driven solutions to a myriad of industries.

In yet another aspect, the invention may include a mobile system for distributing videos through a private, confidential system, comprising: a source of video content; a streaming server in communication with a management system for controlling the operation of the streaming server to provide video content to a user via a private network line; and a content server resident at a user location, the content server in communication with the private network line, the content server having a processor configured using software programming commands to receive content requests from a user's device and to transmit requested content to the user's device for display to the user.

In one aspect, the invention includes a mobile system further comprising an application including software commands configured to enable communication by the user's device to the content server, the application including a user interface enabling user selection of video content.

In an alternative aspect, the application includes software commands that provide an interface allowing a user to selected video content and to display the video content on the user's device in a selected language. In another aspect, the private network line is a T1 line.

In yet another aspect, the system includes an email and/or a notification capability, wherein the email and/or notification capability may be configured to communication with selected user's or groups of user's to provide information related to the availability of content, feedback, and other company related messages and/or notifications. In an alternative aspect, the email and/or notification capability may be processed and tracked using a secure email and/or notification application.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 4 illustrates one embodiment of a backend video interface of the present invention providing videos in different languages, wherein the content and subtitles (if any) are in a selected language.

FIG. 6 illustrates the video list interface of FIG. 5 displayed in French on a user's mobile device by the video player of one embodiment of the present invention.

DESCRIPTION OF THE EMBODIMENTS

Figure 1:
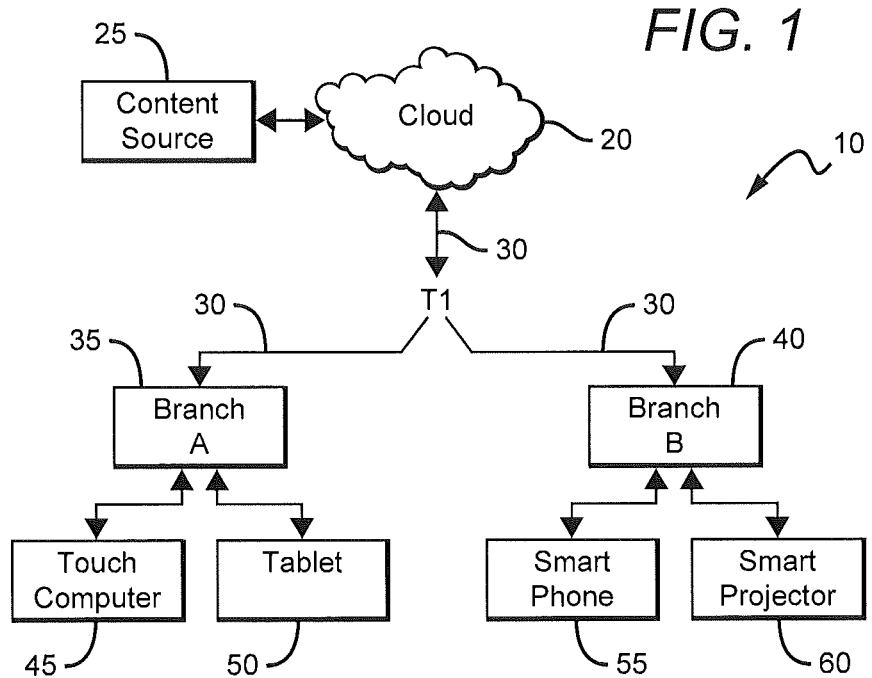
FIG. 1 is a graphic representation of an embodiment of the present invention illustrating a system for distributing video content.

As will be described hereinafter in greater detail, the various embodiments of the present invention relate to a system and method for distributing video content to users requesting display of the video content and/or other information utilizing a closed, secure, network methodology. Other features, such as an email/notification system that can track receipt of the email or notification may also be included. Additionally, the system may be configured to use bar code technology to request specific video content or other information about a product to be displayed to a user of the system.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

In the following description, numerous specific details are set forth in order to provide a thorough understanding of the present invention. It will be apparent, however, to one of ordinary skill in the art, that the present invention may be practiced without these specific details. In other instances, well known components or methods have not been described in detail but rather in a block diagram, or a schematic, in order to avoid unnecessarily obscuring the present invention. Further specific numeric references such as "first driver," may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present invention. The term "coupled" is defined as meaning connected either directly to the component or indirectly to the component through another component.

Throughout the description reference will be made to various software programs and hardware components that provide and carryout the features and functions of the various embodiments of the present invention. Software programs may be embedded onto a machine-readable medium. A machine-readable medium includes any mechanism that provides, stores or transmits information in a form readable by a machine, such as, for example, a computer, server or other such device. For example, a machine-readable medium includes read only memory (ROM); random access memory (RAM); magnetic disk storage media; optical storage media; flash memory devices; digital video disc (DVD); EPROMs; EEPROMs; flash memory; magnetic or optical cards; or any type of media suitable for storing electronic instructions.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, do not refer to the action and processes of a general purpose computer system, or similar electronic computing device. Rather, in the context of the below description, such terms relate to processes carried out by a computer or similar electronic computing device that manipulates and transforms data represented as physical (electronic) quantities within the computer system's registers and memories into other data similarly represented as physical quantities within the computer system memories or registers, or other such information storage, transmission or display devices, under the control of embedded or software programming commands specifically designed to carry out the specific functions of the various embodiments of the invention.

In an embodiment, the logic consists of electronic circuits that follow the rules of Boolean Logic, software that contain patterns of instructions, or any combination of both.

The term "server" is used throughout the following description. Those skilled in the art understand that a server is a computer program that provides services to other computer programs running on the same computer or processor as the server application is running, and/or other computers or processors different from the computer or processor on which the server is running. Often, the computer or processor on which the server program is running is referred to as the server, although other programs and applications may also be running on the same computer or processor. It will be understood that a server forms part of the server/client model. As such, the processor running the server program may also be a client, requesting services from other programs, and also operate as a server to provide services to other programs upon request. It is understood that the computer or processor upon which a server program is running may access other resources, such as memory, storage media, input/output devices, communication modules and the like.

Similarly, a cloud server is a server that provides shared services to various clients that access the cloud server through a network, such as a local area network and the Internet. In a cloud based system, the server is remote from the clients, and various clients share the resources of the cloud server. Information is passed to the server by the client, and returned back to the client through the network, usually the Internet, although where security of the information or data is important, a closed, private network, such as a secure transmission line, such as a T1, or secure peer-to-peer network, may be used.

While the present invention is described in relation to a network system, the principles of the invention are contemplated to be broader than applying only to systems that are resident on a server. In general, the systems and methods of the various embodiments of the present invention may be embodied in any hardware device having a processor that is in operable communication with a storage resource and that may also receive requests from users for access to that storage. For example, in one embodiment, a host bus adaptor board, an Ethernet board (or card), a RAID controller, storage appliance or the like may be configured to receive requests for access to one or more storage devices associated with the host bus adaptor board, Ethernet board, RAID controller, storage appliance or the like and, in accordance with principles of the present invention, be adapted and configured by software or hardware commands to translate the file structure and data stored on the requested storage resource into a form that is useable by the requester. It is contemplated that the present invention is readily extensible to other applications, devices or appliances, such as a cell phone, PDA (personal data assistant) or a chipset configured to carry out the processes described herein.

Examplary methods may be better appreciated with reference to flow diagrams. While for purposes of simplicity of explanation, the illustrated methods are shown and describes as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional blocks not illustrated.

The illustrated methods may be implemented as processor executable instructions stored on computer readable media. Such instructions, when executed by a processor, computer or server, cause the processor, computer or server to perform the illustrated method or methods.

In one embodiment, the invention includes a mobile solution that resolves the communication and engagement challenge that companies face on a daily basis. Such a system is a secure and private complex and sophisticated solution interfaced through a mobile video app that compliments existing employee communication of large multinational companies solving the problem of disengaged employees, with immediate and direct communication in several languages. Alongside with the comprehensive module for direct communication and video communication, the system solves the private network bottleneck of video streaming by engaging local server communicating with a mainframe during off peak band width periods, such as business closing times, and distributing the content locally through a private WiFi network.

In other embodiments, the system may also be configured as a plug in to a software based inventory system supporting bar codes. In such an embodiment, a video including product information may be called by scanning a barcode associated with a product.

In yet another embodiment, the invention includes an app that is fully customizable to meet the needs of a company or organization to provide with secure and direct communication to its employees or members. Security of the transmitted content may be ensured by using various methods of isolating the system and information from the public, such as, for example, and not limited to, utilizing encryption of the transmitted information which is then decrypted by the mobile app described above when displayed to a user's mobile device. The app may also transmit a receipt of confirmation of communication read by each recipient using a private or notification feature, such as, for example, a secure email message or text message from the user's mobile device to the server or computer providing and/or controlling distribution of the video content communicated to the user's mobile device.

FIG. 1 is a graphic diagram of the business to business (B2B) solution system where private Push Notification is used and video streaming is automated for a large volume of video encoding. In this exemplary embodiment, content is stored or otherwise made available to a cloud server center, which typically includes streaming servers and a management system.

Clients utilizing the system of the various embodiments of the present invention contract with the cloud server center to be able to acquire or access content stored in the content source database. In order to provide a closed system, access by the company is accomplished using a private network method, such as via a T1 line. Access to streaming server is not available over a public transmission method, such as over the Internet.

Referring to FIG. 1, system 10 includes a cloud system which is used by the end user to provide access to video or other informational content stored on a content source 25. The cloud system may be operated by the end user, or more typically, will be operated by a third party. The cloud system will typically include a management system including processors and associated memory that is used to control the operation and communications between the content source and user's requesting content from the content source. Communications may be provided by a streaming server, and may also include various servers such as SMS, EPG, IMP and EMS servers.

Connection to the cloud system is provided by use of a T1 30 or other secure, private, network communication pipeline. In this way, communication between the user and cloud system is protected from intrusion by unaffiliated entities who lack the relevant permission necessary to access the content stored in the content source. Use of a private communication pipeline, such as a T1 line, also provides a known bandwidth for use in downloading content from the cloud system, thus avoiding bandwidth problems that are inherent to the use of public pipelines, such as the Internet.

In this exemplary embodiment, a corporation or other entity contracts with the cloud system to store content on the content source, which may be a database of video content or other media. As shown in FIG. 1, the contracting entity may include more than one location, subsidiary, division, or the like, such as, for example, branch A 35 and branch B 40.

Each of branch A and branch B includes a router or other device that provides for connectivity with T1 line 30. A processor or a server may be then connected to the router of other device. In one embodiment, the server may be a micro server with built-in CDN software. Additionally, the processor or server may also include hardware and software that allows various electronic devices to attach to a private network disposed within branch A and branch B to allow employees to receive communications from the server related to the content retrieved from content source 25. For example, employees may connect to the network administered by the processor or server of branch A 35 or the processor or server of branch B 40. The devices that may be connected to the private networks of branch A and branch B may, for example, but not limited to, electronic devices such as a touch computer 45, tablet 50, such as an iPad or the like, a smart phone 55, and a smart projector 60. As those skilled in the art are aware, such devices include hardware and software configured to connect to networks, and such connections are administered by well-known communication protocols, using suitable identification and security passwords.

As stated above, in another embodiment, a micro server may be located in each location of a company utilizing the system of the present invention. This system is again configured to provide a secure, private system, wherein information such as videos may be communicated to the various departments and/or employees of the company. One such system may be a WiFi system.

One advantage of having an on-site server that communicates with, and receives downloaded information and video content from the cloud server center, is that the content may be downloaded to the on-site server during low use times of the private network or T1 line. A request for content is sent by a player device such as, for example, smart phone 55, through an in-house network such as, for example, a secure WiFi router. The request for content is routed through the micro server of the branch, which provides the content if the content is stored in a local memory. If the requested content is not stored in a local memory, the micro server may then request delivery of the content from the content source 25 through the cloud system. Once the content is retrieved from the content source 25, it is them communicated to the requesting smart phone through the private network of the branch. In some embodiments, the content may then be stored in the local memory by the micro server if the processor of the micro server, programed using appropriate software commands, determines that the content may be frequently requested. The frequency of use of the requested content may be determined using suitable rules embodied in software commands.

Typically, a smart phone requesting content from the private network is typically running an application ("app") that supplies a user interface to the user of the smart phone so that the user may select the video content or information that the user wishes to view. For example, the interface may be configured to not only allow selection of a particular video or information package, but may also allow the user to select, for example, a language in which the content or information will be displayed. Other parameters for playback may also be provided by the interface, depending on the configuration of the application running on the playback device.

Once the request for the video content or information has been transmitted to the on-site micro server, the processor of the on-site server processes the request and retrieves the requested content in accordance with the parameters of the request from a memory associated with the server and formats the video content or information in accordance with the request and transmits the content or information to the playback device. As stated previously, the memory may be local to the micro server, or the content and information may be retrieved from a memory of the content source associated with the cloud system.

Alternatively, the application running on the playback device may be configured to receive the transmitted video content or information from the micro server and then format the video content or information using the proper parameters of the playback device.

As will be seen from the below description, such a system allows for the private transmission of videos and the like to various devices used by employees, such as a smart phone, touch computer, table, smart projector, and the like.

Figure 2:
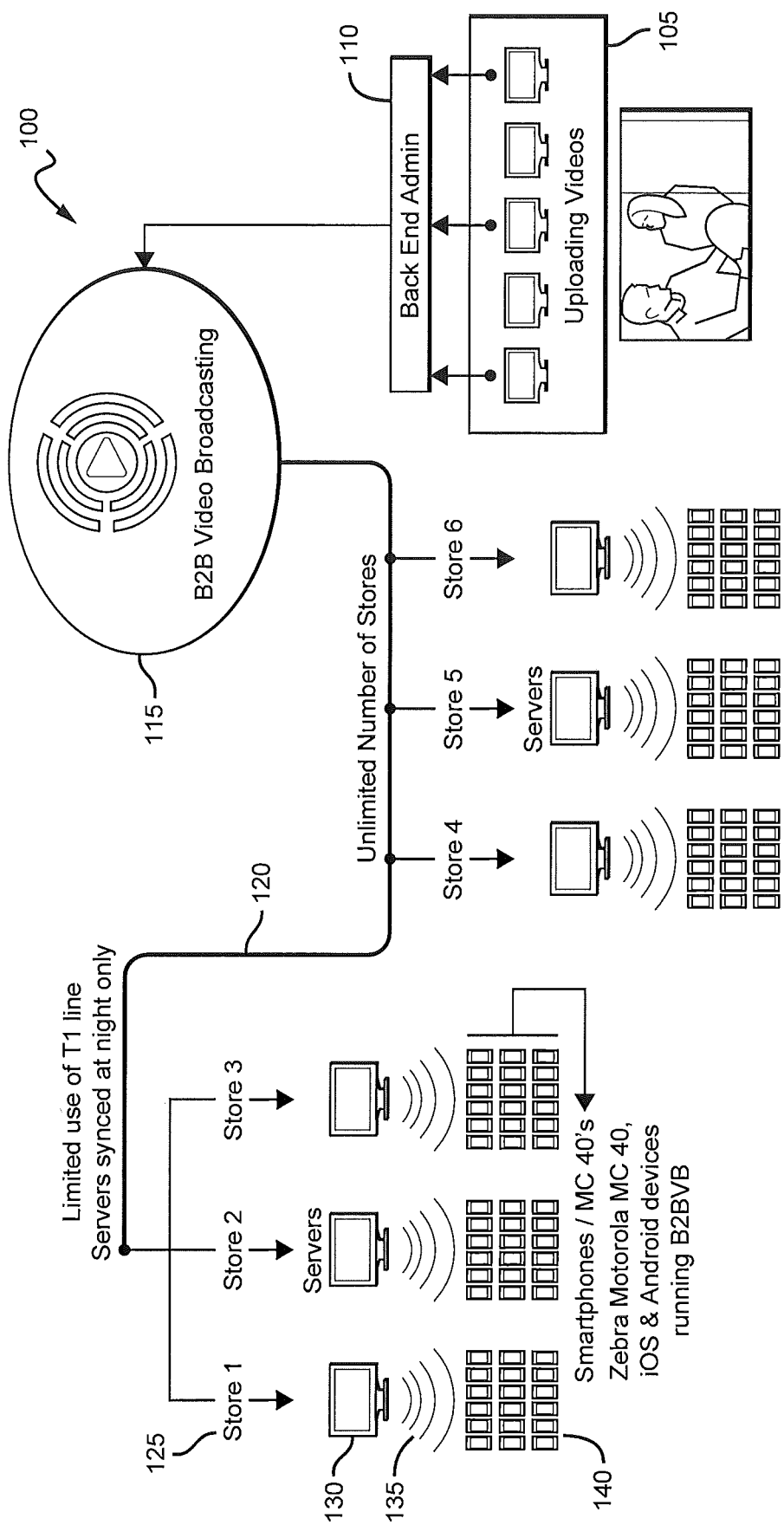
FIG. 2 is a graphic representation of an embodiment of the present invention illustrating a network system for distributing video content to stores and user's mobile devices.
Figure 3:
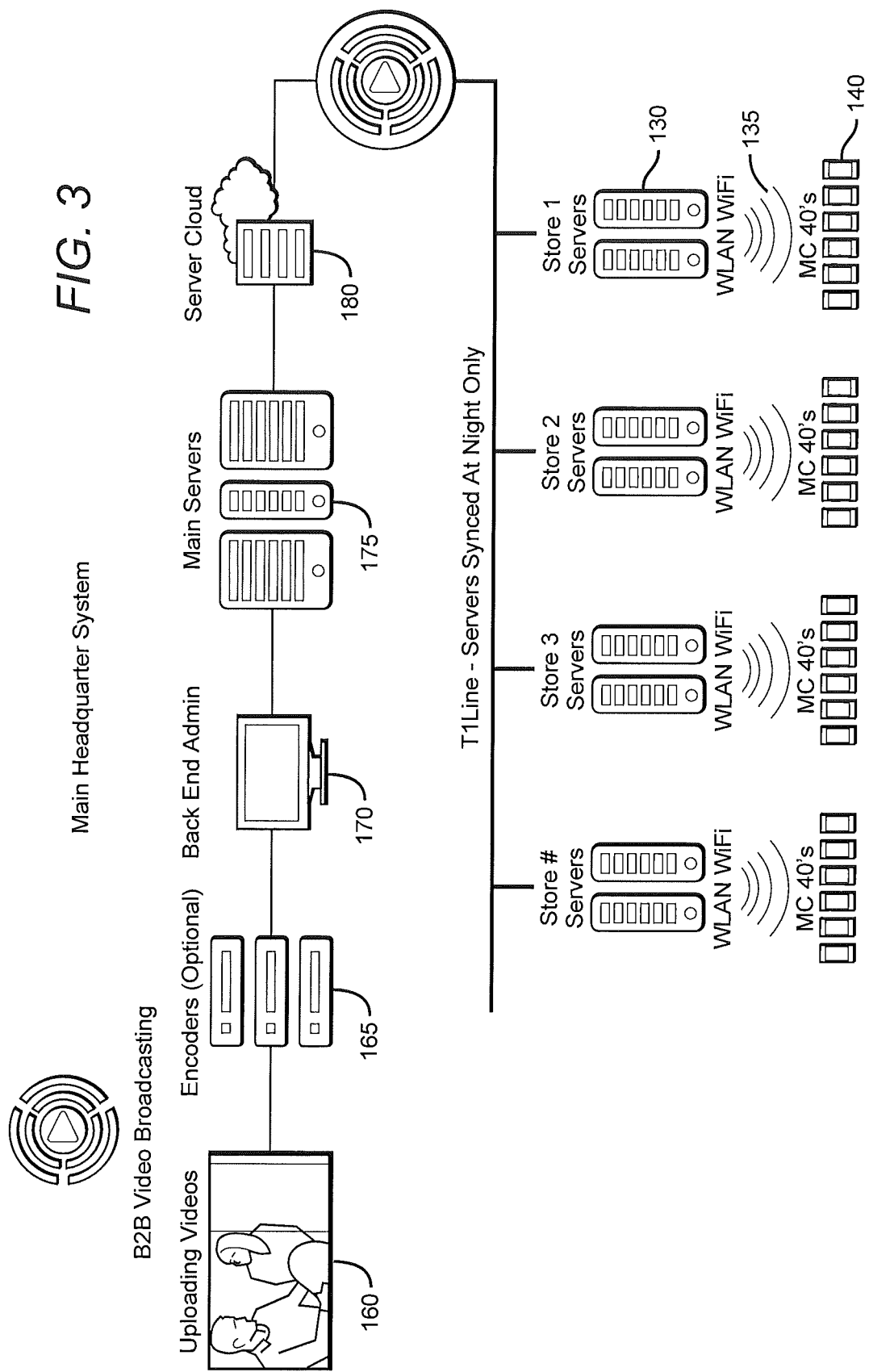
FIG. 3 is a graphical representation of further details of the embodiment of FIG. 2.

FIGS. 2 and 3 are graphic schematic diagrams illustrating the B2B solution system solving the private network bottleneck of video streaming with a proprietary solution engaging a local server communicating with a mainframe of a company wherein data comprising videos and the like are transmitted during business closing times, such as at night, and distributing the video data locally within the company via a private WiFi network. The various embodiments of the present invention are platform independent and work on Unix, Linux, OS and Windows. The app works on Android, iOS and Blackberry.

Referring now to FIG. 2, in an embodiment, video content is uploaded in box 105. Back end administration processes, such as cataloging, formatting, and the like, are carried out in box 110. The processes of box 110 may occur locally at the site of the uploading of the video content, or they may be carried out remotely, either using processors, servers, and services associated with the cloud system 115, or at some other remote from the uploading facility or process.

The uploaded video content which is stored in a memory in communication with the servers and services of the cloud system 115, may be distributed to various user locations such as store 1 125, and the like. As shown in FIG. 2, six stores are shown that may receive video content from the cloud system 115. While the local store systems are shown as having identical hardware and software packages configured for receiving, processing, and distributing the communicated video content, it will be understood that such identity of hardware and software is not necessary in each store, provided that the hardware and software may be programmed to accomplish the objectives of the invention.

As shown, the uploaded video content is communicated to, for example, store 1 125 using a T1 line to provide bandwidth and security. In the embodiment shown, the video content download to store 1 may be controlled by the processors and servers in the cloud system 115, in cooperation with the receiving server 130 of the store, to only synchronize the video content stored at the local location with the content stored in the cloud storage during time periods of low usage of the T1 line, such as late at night. In this way, the system is able to prevent the availability of sufficient bandwidth from delaying the delivery of the content to the store. It will be understood that while the term "store" has been used, that term also refers to identify any local entity, such a company or division of a larger company, that is part of the video content distribution system.

Once the new video content has been received by server 130, it may be stored in a local memory (not shown) in communication with the server 130. The local system in store 1 also includes connectivity to a network system 135 that allows user's electronic devices, such as a mobile phone or other device, to connect to the network 135 to request and receive video content. The electronic device may be, for example only, and not limited to, a Zebra Motorola MC 40, or any other IOS or Android device.

FIG. 3 is a graphical representation of another embodiment of the present invention illustrating additional detail of the back end system described above. In this embodiment, video content is prepared and uploaded in box 160. The video content is optionally encoded at box 165. Back administration of the content is performed at box 170, and then communicated through servers 175 and stored in a database stored on the cloud system 180. As described above, video content may then be requested by a user 140 through network 135 from the local server 130 at store 1. Video content may be synchronized at night only, for example to ensure timely and efficient synchronization of the videos stored at the store and in the cloud.

FIG. 4 illustrates one embodiment of a backend video interface 200 of the present invention that may be used in carrying out the processes included in back end administration processes of box 170 (FIG. 3). In this embodiment, the backend video interface allows videos distributed by the various embodiments of the present invention to be provide in an unlimited number of languages, As shown, the interface allows an administer to select what language in which video content is stored and provided. For example, the video may be translated and provided in English, Spanish, Chinese, Italian, French, and German. The interface provides tabs to allow either deletion of the translated video content from the list, or to individually update the parameters associated with a specific language translation. In the example shown, a video description may be included that describes the video content, and the description is displayed in the language of the translation. Moreover, subtitles in a chosen language may also be associated with the translated video content.

Figure 5:
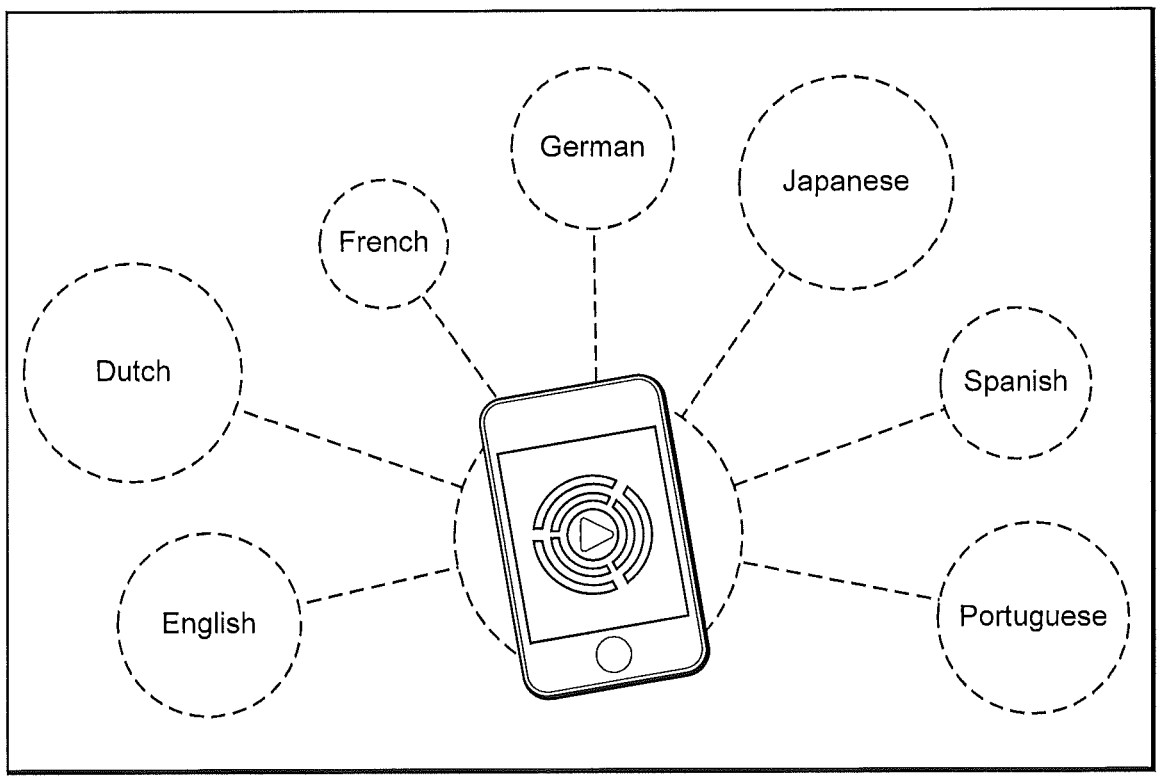
FIG. 5 is a graphic illustration of one embodiment of the backend video interface of FIG. 4 showing a display generated by the app on a smart phone enabling a user to select a language to be used during video playback.

FIG. 5 is a graphic illustration of one embodiment of an interface that may be displayed to a user requesting video content on a mobile device, When a user requests video content on his/her mobile device, the interface is displayed on the mobile device. The user may then select the desired language from the display by, for example, touching the displayed language, such as "French" on the mobile device. Once the language is selected by the user, the video content requested will then be played back on the user's mobile device in that language.

FIG. 6 illustrates an embodiment of the present invention wherein a user's mobile device, here an iPhone running the iOS operating system, is being used to request video content from the various embodiments of the system described above. In this embodiment, a list of available videos are presented in the display of the iPhone in French, which was selected as the playback language in the interface of FIG. 5. As shown, the interface also includes a touch button labeled "Languages." In the event that the user selected the wrong playback language, touching the "Languages" button will return the display to the interface shown in FIG. 5, allowing the user to re-select the playback language.

Figure 7:
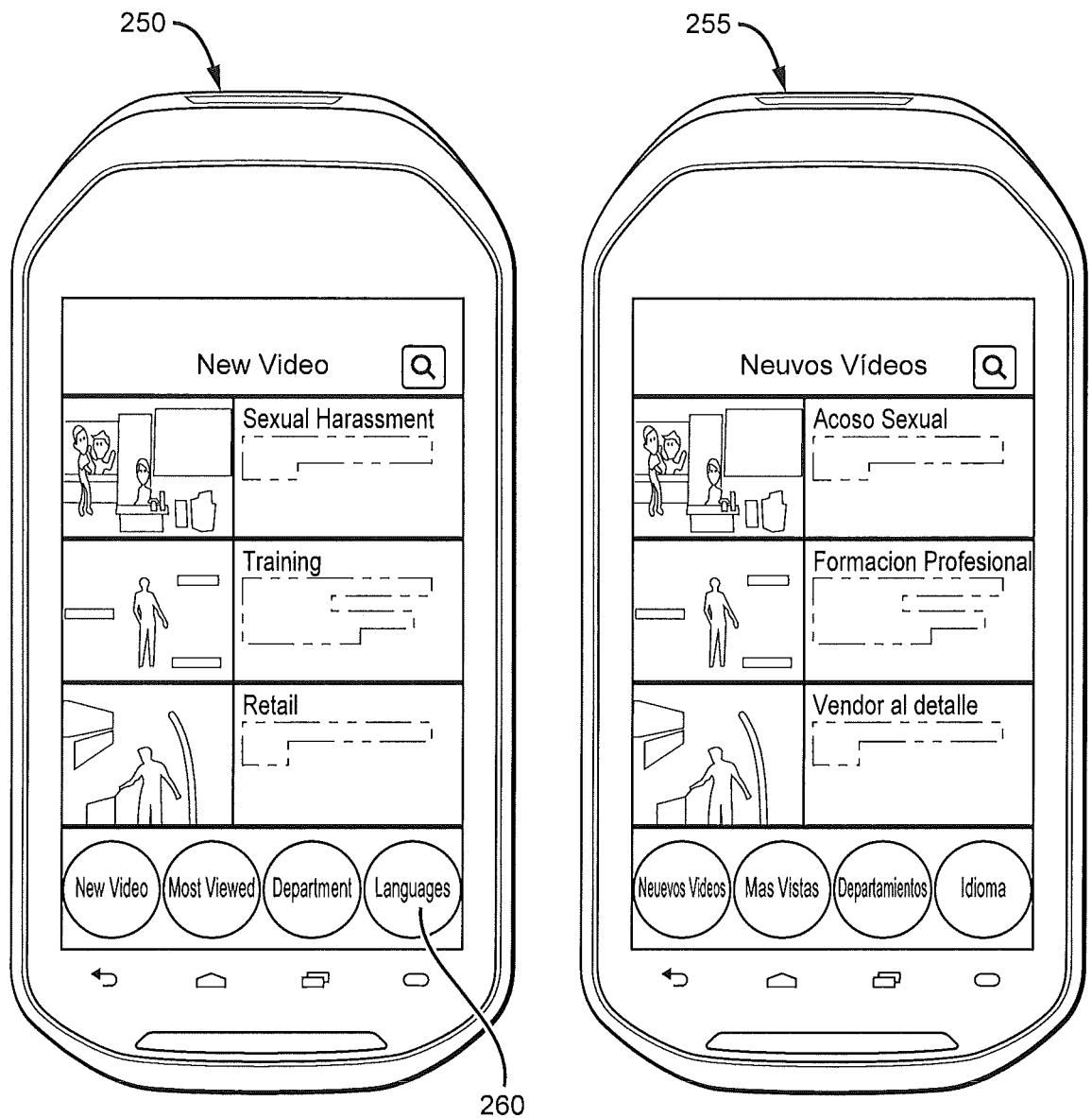
FIG. 7 illustrates the video list interface of FIG. 5 showing the video list interface displayed in English in a mobile device, the redisplayed on the mobile device in Spanish after selecting Spanish from the interface of FIG. 5.

FIG. 7 illustrates how the playback language may be changed. The display on device 250 shows a video list in the English language. In the event that the user desires a different play back language, such as, for example, Spanish, the user touches the "languages" button 260 and then selects "Spanish" from the interface illustrated in FIG. 5. The display is then changed as shown on device 255, where the video list is now displayed in Spanish. Thus, an advantage of the embodiments of the present invention is that not only can the language for video playback be changed, but the language for all of the displays of the playback device are changed to the selected language.

Figure 8:
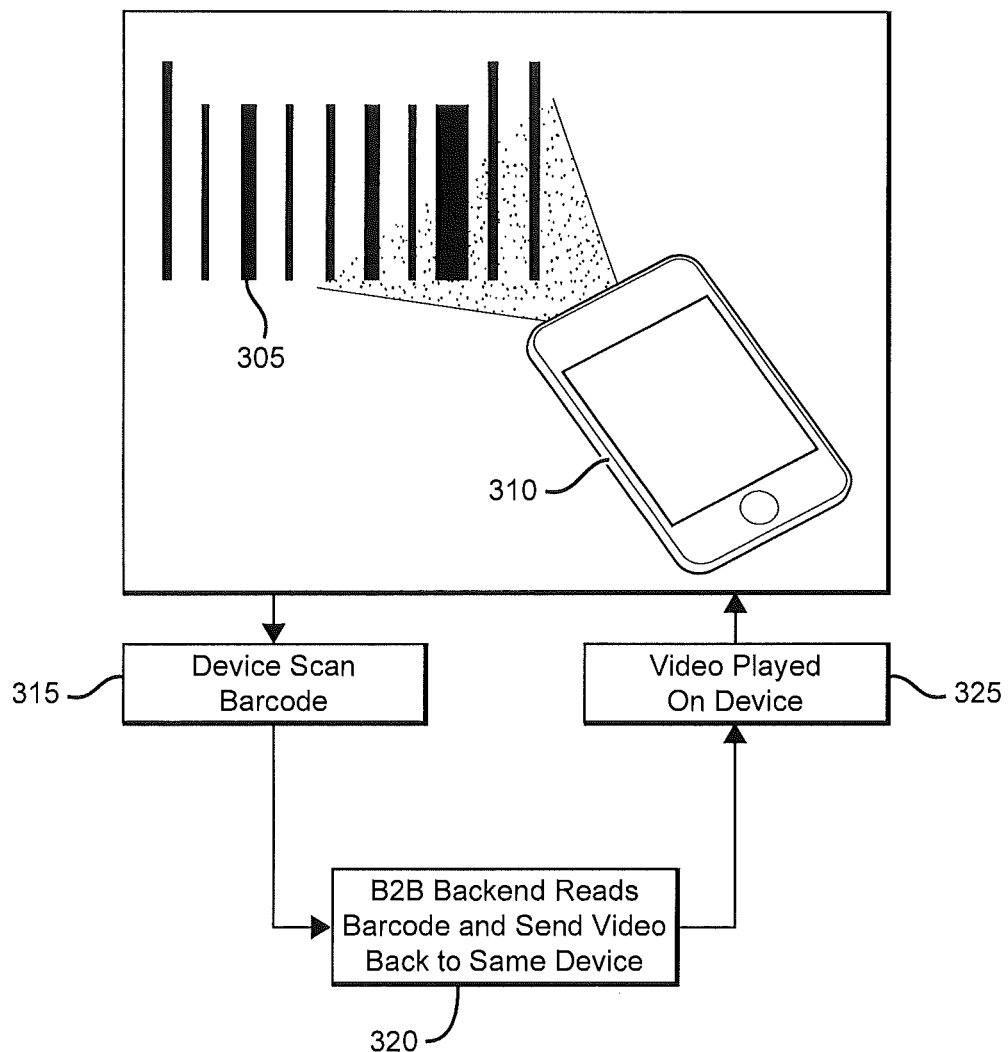
FIG. 8 is a graphical representation of an embodiment of the present invention that is operating on a scanning device.

FIG. 8 is a graphical representation of an embodiment of the present invention that is configured to operate on a mobile device 310 that includes a bar scanner to read a bar code 305. In this embodiment, a user may use the scanner of the device to scan the bar code 305 associated with a particular product or service as shown in box 315. The bar code is analyzed by the system in box 320, identifies the product represented by the barcode 305, and transmits a video associated with the product or service identified by the bar code back to the mobile device so that the video may be displayed to the user. Once the video is received by the mobile device, the video is played back on the mobile device in box 325.

Figure 9:
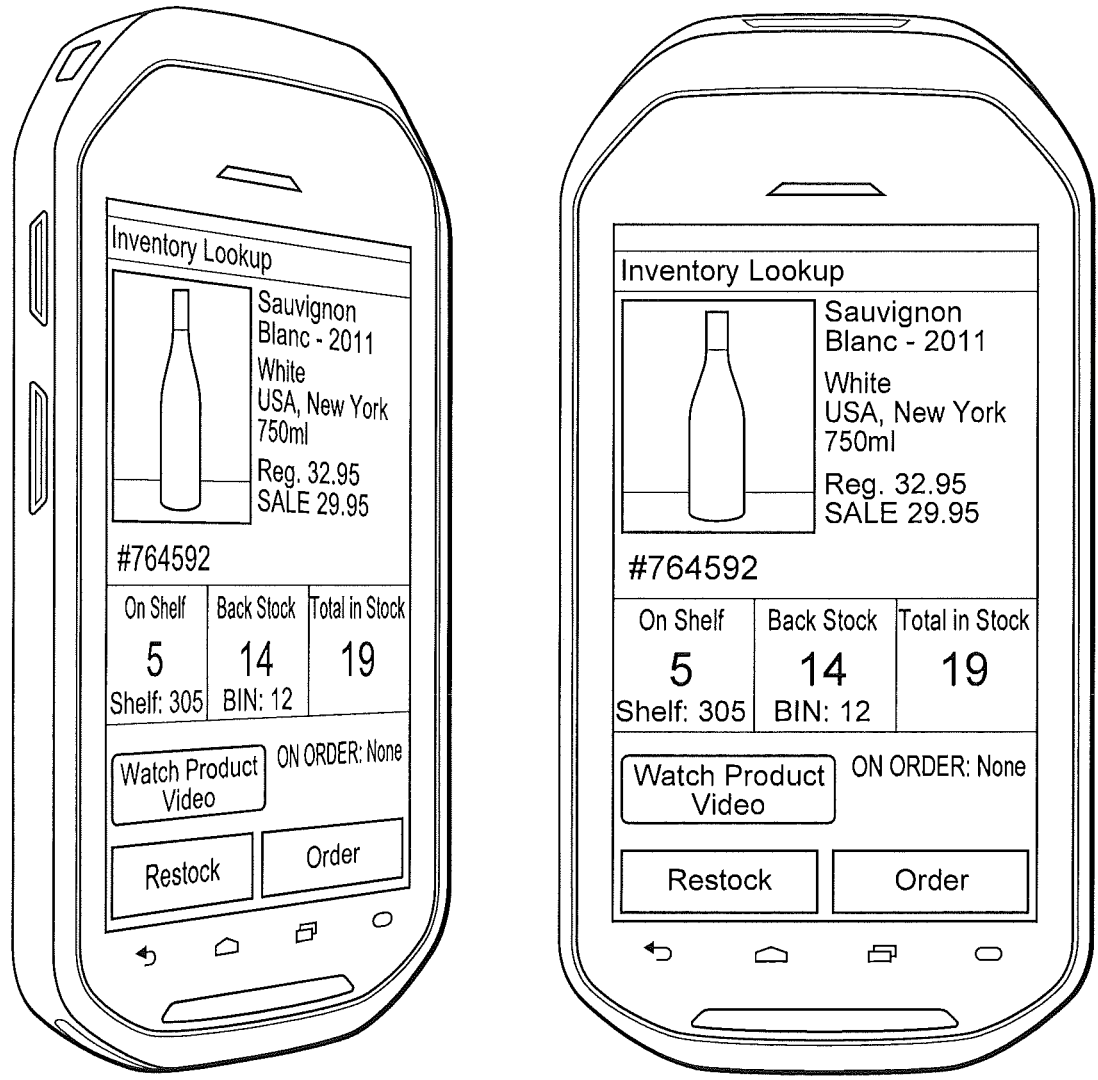
FIG. 9 is a graphical illustration of on embodiment of the invention configured to plug in within an inventory barcode management system to facilitate communication and training during inventory taking.

It will be understood that such an embodiment may provide other types of information to the mobile device other than video content. The embodiment depicted in FIG. 9 depicts on embodiment of the invention configured to plug in within an inventory barcode Management System to facilitate communication and training during inventory taking. As shown, a product information video related to the invention item can be called and displayed by scanning the product barcode of the product with the scanning device.

For example, as depicted in FIG. 9, scanning the bar code on a bottle of wine may result in a display of certain parameters or characteristics associated with the SKU of the bottle of wine scanned, such as, for example, the price, type of wine, location of the vineyard or bottler, the SKU number, how many bottles are in stock, and where that stock is located. A "Watch Product Video" button can be activated to display a video about the wine. While the embodiment shown in FIG. 9 depicts a device configured to monitor inventory, similar applications may be provided to consumers which display similar information, but omit the inventory control functions of the embodiment.

One advantage of the various embodiments of the present invention is that software commands of those embodiments are configured to operate on various playback devices such as Symbol, Motorola and Zebra industrial smart scanner devices. Further, the various embodiments of the app in accordance with the present invention are capable of surviving rigorous stress industrial stress testing for reliability as indicated by having been certified by Zebra and Motorola.

Figure 10:
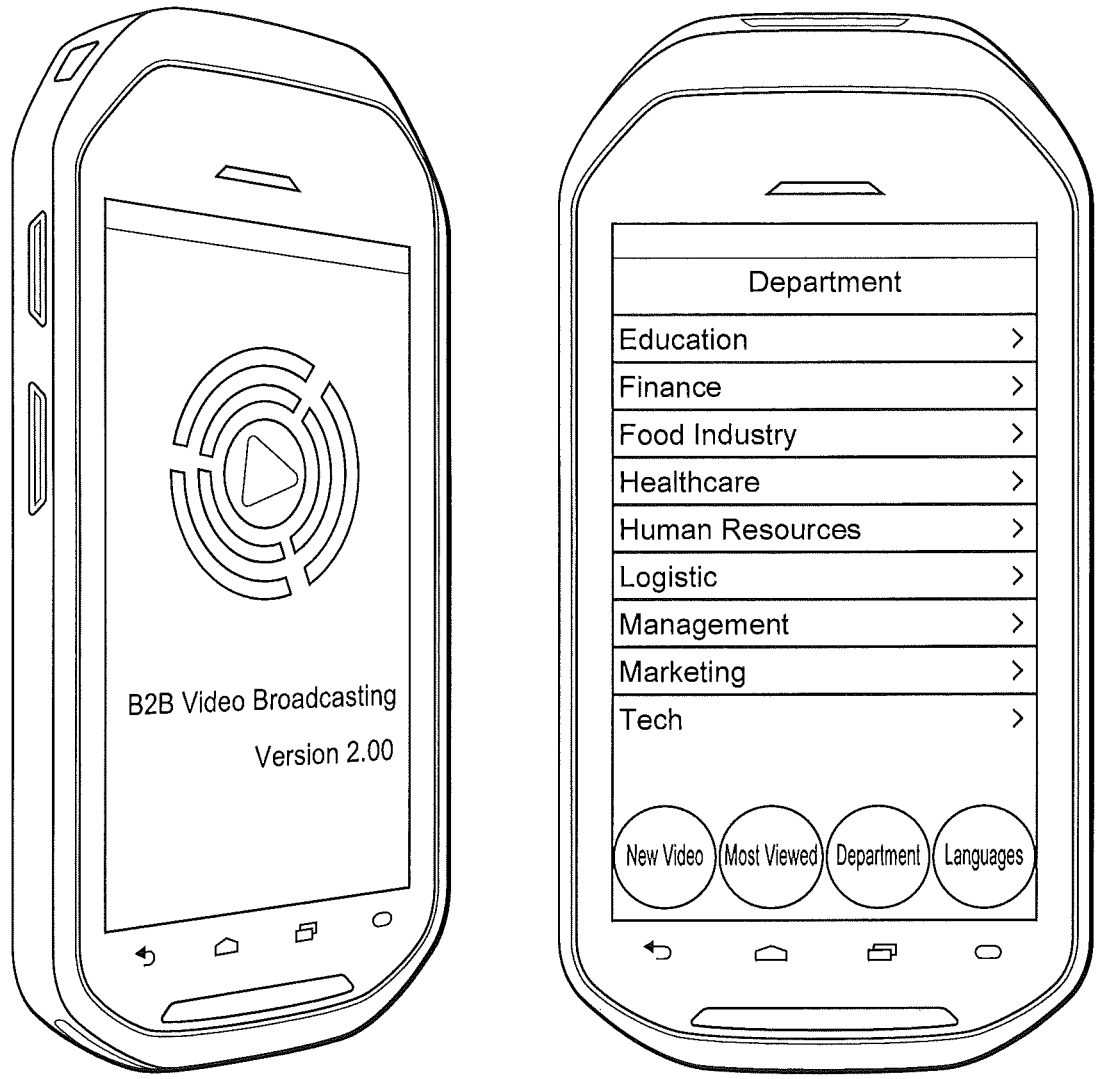
FIG. 10 is a graphical representation of one embodiment of the present invention illustrating an exemplary listing of videos that are available for viewing sorted by department.

The various embodiments of the present invention may be configured in various ways to meet the needs of a company or other entity that employ them to communicate with its employees or associates. For example, as shown in FIG. 10, the list of videos displayed to a user may be sorted in a variety of ways, such as, by department. Thus an employee searching for video content provided by the, for example, Human Resources department, may activate the app on their mobile device, and then select the Human Resources department from a list of departments. This selection results in display of a list of video content provided by the Human Resources department.

Use of the various embodiments of the present invention can provide an optimal employee engagement experience for different individual departments, such as, for example, Healthcare, Human Resources, Education, Retail and many more, due to the ability of the various embodiments of the system of the present invention to be configured to display various languages interfaces and content support.

Another embodiment of the present invention may be configured to provide E-mails and Push Notifications to employees mobile device. Such messages may be sent by management to let employees known when a new video has been added to a company's inventory of videos, to request feedback from specific portions of the company, or to provide motivational messages to all employees, to specific regions, or to specific individuals. Employees may use the system to upload their videos as direct video communication and/or feedback from Head Departments. Such an embodiment may include full encryption and receipt of confirmation of communication using a system such as one provided by RPOST Communications, LTD's proprietary system for Secure & Certified Electronic Communications.

The various embodiments of the system in accordance with the principles of the present invention may be configured as a completely closed, confidential, and private system. Such an embodiment utilizes private dedicated lines to distribute and communicate videos and information throughout the system, and does not provide access to public video sharing servers such as You Tube, Vimeo, and the like. The various embodiments of system of the present invent may be configured to prohibit sharing of content, or social media access to social media apps or locations such as Facebook, Tweeter and the like. In this manner, no videos or information communicated by the system throughout the system of the present invention can be leaked beyond the company.

Utilization of the various embodiments of the present invention are advantageous in that they provide for enhanced and improved employee communication and engagement. The various embodiments of the system of the present invention are designed for direct communication and video communication between management and employees, and provides an engaging, fun way for companies to communicate with their employees. The various embodiments of the present invention can help teach, inform, motivate and empower employees, thus providing for the creation of inner communities which increases productivity and reduces turnover, saving costs and increasing profits.

While particular embodiments of the present invention have been described, it is understood that various different modifications within the scope and spirit of the invention are possible. The invention is limited only by the scope of the appended claims.

I claim:

1. A system for distributing videos through a private, confidential system, comprising:
   a source of video content;
   a streaming server in communication with a management system for controlling the operation of the streaming server to provide video content to a user via a private network line;
   a back end system configured to provide an email notification to the user that new video content has been added to the streaming server and an instruction that an entirety of the new video content should be viewed by the user;
   a smart phone, the smart phone including a camera configured as a bar code scanner;
   a content server resident at a user location, the content server in communication with the private network line and the smart phone, the content server having a processor configured using software programming commands to:
      receive content requests from the smart phone and to transmit requested content to the smart phone for display on the smart phone,
      query the streaming server for requested content, receive the requested content from the streaming server only during periods of low usage of the private network line, transmit the requested content to the smart phone for display on the smart phone, provide confirmation that the transmitted content was displayed on the smart phone, and provide a measure of compliance by the user with the instruction to view the entirety of the new video content;

an application resident on the smart phone, the application configured to enable communication by the smart phone to the content server, the application also configured to scan a bar code, the application including a user interface enabling user selection of video content; and wherein the content request is generated by the application from a scanned bar code, wherein the scanned bar code is associated with a pre-selected video content, and wherein the content server streams the pre-selected video content to the smart phone for display.

2. The system of claim 1, wherein the application includes software commands that provide an interface allowing a user to select video content and to display the video content on a user's device in a selected language.

3. The system of claim 1, wherein the private network line is a T1 line.

4. The system of claim 1, including an email and/or a notification capability, wherein the email and/or notification capability may be configured to communicate with selected users or groups of users to provide information related to feedback, and other company related messages and/or notifications.

5. The system of claim 4, wherein the email and/or notification capability may be processed and tracked using a secure email and/or notification application.

6. A system for distributing videos through a private, confidential system operated by a business, comprising:

a database containing video content;

a management system having an email and/or notification capability configured to provide an email notification to a user that new video content has been added to the database and an instruction that an entirety of the new video content should be viewed by the user;

a server in communication with the database, and also in communication with the management system for controlling the operation of the server to respond to user requests for video content and to provide requested video content in response to the user requests;

a private network in communication with the server and management system; and a content server resident at a location of a business, the content server in communication with the private network, the content server having a processor configured using software programming commands to receive the video content requests from a user's mobile device and to transmit the requested video content requests to the server and management system, to receive requested content from the server when the business is closed, to communicate the received video content to the user's mobile device for display to the user, to provide confirmation that the video content communicated to the user's mobile device has been displayed to the user, and provide a measure of compliance by the user with the instruction to view the entirety of the new video content.

7. The system of claim 6, wherein the user's mobile device includes a camera, and further comprising an application including software commands configured to enable communication by the user's mobile device to the content server, the application including a user interface enabling user selection of video content, the application also configured to capture an image of a bar code from the camera, and wherein the video content request is generated by the application from the image of the bar code, wherein the image of the bar code is associated with a pre-selected video content, and wherein the content server streams the pre-selected video content to the user's mobile device for display.

8. The system of claim 7, wherein the application includes software commands that provide an interface allowing a user to select video content and to display the video content on the user's mobile device in a selected language.

9. The system of claim 6, wherein the private network includes a T1 line.

10. The system of claim 7 wherein the management system may be configured to communicate with selected users or groups of users to provide information related to feedback, and other company related messages and/or notifications.

11. The system of claim 10, wherein the email and/or notification capability may be processed and tracked using a secure email and/or notification application.

12. A system for distributing videos through a private, confidential system located within a business, comprising:

a database containing video content;

a management system having an email and/or notification capability configured to provide an email notification to a user that new video content has been added to the database and an instruction that an entirety of the new video content should be viewed by the user;

a server in communication with the database, and also in communication with the management system for controlling the operation of the server to respond to user's mobile device requests for video content and to provide requested video content in response to the user's requests;

a private network in communication with the server and management system;

a content server resident at a location of a business, the content server in communication with the private network, the content server having a processor configured using software programming commands to receive the video content requests from the user's mobile device and to transmit the requested video content requests to the server and management system, to receive requested content from the server when the business is closed, to communicate the received video content to the user's mobile device for display to the user, and to provide a confirmation that the communicated video content to the user's mobile device has been displayed on the user's mobile device, and provide a measure of compliance by the user with the instruction to view the entirety of the new video content;

an application resident on the user's device, the application including software commands configured to enable communication by the user's mobile device to the content server, the application including a user interface enabling user selection of video content;

wherein the user's mobile device includes a camera, and wherein the application is also configured to capture an image of a bar code from the camera, and wherein the video content request is generated by the application from the image of the bar code, wherein the image of the bar code is associated with a pre-selected video content, and wherein the content server streams the pre-selected video content to the user's mobile device for display; and wherein the private network includes a T1 line connecting the server and the content server.

13. The system of claim 12, wherein the application includes software commands that provide an interface allowing a user to select video content and to display the video content on the user's mobile device in a selected language.

14. The system of claim 12, including an email and/or a notification capability, wherein the email and/or notification capability may be configured to communicate with selected users or groups of users to provide information related to feedback, and other company related messages and/or notifications.

15. The system of claim 14, wherein the email and/or notification capability may be processed and tracked using a secure email and/or notification application.

* * * * *